3,534,062
DIBENZOTHIADIAZOCINES
John B. Wright, Kalamazoo, Mich., assignor to The Upjohn Company, Kalamazoo, Mich., a corporation of Delaware
No Drawing. Filed May 16, 1967, Ser. No. 638,740
Int. Cl. C07d 93/36
U.S. Cl. 260—327     5 Claims

ABSTRACT OF THE DISCLOSURE

5H - dibenzo[c,g][1,2,6]thiadiazocine-6,6-dioxides are prepared by condensing a 2-nitrobenzenesulfonyl chloride with a 2-aminobenzophenone, followed by catalytic reduction and cyclodehydration.

These compounds are useful as starting materials for the preparation of bleaching agents, disinfectants, mothproofing agents, and/or herbicides; they are also useful as protective agents against anaphylaxis and other allergic conditions, and as antidiabetic agents.

BACKGROUND OF THE INVENTION

The 5H - dibenzo[c,g][1,2,6]thiadiazocine-6,6-dioxides disclosed and claimed herein have not been reported previously in literature.

SUMMARY OF THE INVENTION

The compounds contemplated herein can be represented by the structural formula

I

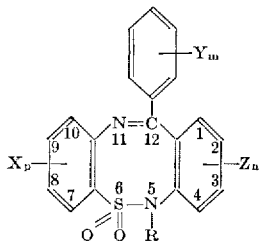

wherein X, Y, and Z can be halo, trifluoromethyl, alkyl, or alkoxy radicals and R can be hydrogen, alkyl, aralkyl, alkanoyl, alkylaminoalkyl, 1-pyrrolidinylalkyl, alkyl-substituted 1-pyrrolidinylalkyl, piperidinoalkyl, alkyl-substituted piperidinoalkyl, hexahydro-1-azepinylalkyl, or alkyl-substituted hexahydro-1-azepinylalkyl radical. The respective alkyl portions of the foregoing radicals contain no more than four carbon atoms, however, and $n$, $m$, and $p$ are integers having a value from 0 to 3, inclusive.

These compounds are useful as starting materials for the preparation of bleaching agents, disinfectants, mothproofing agents, and/or herbicides; they are also useful as protective agents against anaphylaxis and other allergic conditions, and as antidiabetic agents.

DETAILED DESCRIPTION OF THE INVENTION

The compounds of the present invention, shown by Formula I, can be prepared by condensing, under reflux conditions, a 2-nitrobenzenesulfonyl chloride represented by the structural formula

II

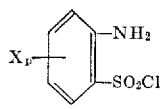

with a 2-aminobenzophenone represented by the formula

III

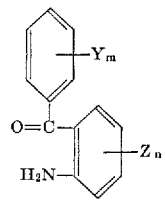

in an inert organic solvent such as pyridine, or the like, to produce the corresponding 2'-aroyl-4-nitrobenzenesulfonanilide which can be shown by the formula

IV

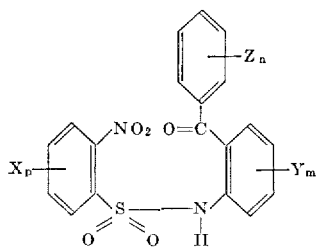

X, Y, Z, $m$, $n$, and $p$ having the same meaning as above.

Compounds of the type shown by Formula IV are then reduced using iron and acetic acid, a noble metal catalyst such as platinum and hydrogen under pressure, zinc and acetic acid, or zinc and hydrochloric acid, to the corresponding 2'-aroyl - 4 - aminobenzenesulfonanilides which can be shown by the formula

V

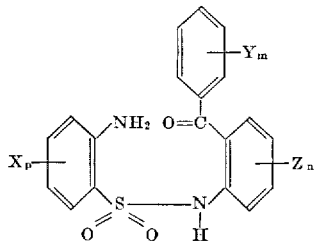

X, Y, Z, $n$, $m$, and $p$ having the same meaning as above.

Cyclodehydration of compounds of the type shown by Formula V in an aromatic solvent such as toluene, benzene, xylene, or the like, produces compounds shown by Formula I where R is hydrogen. The cyclodehydration is carried out in an acid medium, i.e., in the presence of an acid such as concentrated sulfuric acid, aluminum trichloride, p-toluene sulfonic acid, and the like, and under reflux conditions.

In Formulas I, II, III, IV, and V, illustrative alkyl radicals are methyl, ethyl, propyl, isopropyl, butyl, isobutyl, sec.-butyl, and tert.-butyl; illustrative aralkyl radicals are benzyl, phenylethyl, naphthylethyl, phenylbutyl, and the like; illustrative alkoxy radicals are methoxy, ethoxy, the propoxy, and the butoxy radicals; and illustrative alkanoyl radicals are formyl, acetyl, propionyl, butyryl, and the like.

Similarly, illustrative alkylaminoalkyl radicals are (methylamino)ethyl,
2-(diethylamino)ethyl,
3-(diethylamino)propyl,
4-(diethylamino)butyl,
4-(N-methyl-N-ethylamino)butyl,
2-(isopropylamino)ethyl,
2-(diisopropylamino)ethyl,
4-(tert.-butylamino)butyl, and the like;

illustrative alkyl-substituted 1-pyrrolidinylalkyl radicals are 2-(2-methyl-1-pyrrolidinyl)ethyl,
3-(2-methyl-1-pyrrolidinyl)propyl,
2-(2,2,4-trimethyl-1-pyrrolidinyl)ethyl,
(2-methyl-1-pyrrolidinyl)methyl,
4-(2,4-diethyl-1-pyrrolidinyl)butyl,
4-(2-butyl-4-ethyl-1-pyrrolidinyl)butyl,
2-(3-tert.-butyl-1-pyrrolidinyl)ethyl, and the like,
illustrative alkyl-substituted piperidinoalkyl radicals are
2-(2-methylpiperidino)ethyl,
2-(3-methylpiperidino)ethyl,
2-(4-methylpiperidino)ethyl,
4-(3-isopropylpiperidino)butyl,
4-(4-tert.-butylpiperidino)butyl,
3-(2-methyl-5-ethylpiperidino)propyl,
2-(2,3,5-triethylpiperidino)ethyl,
4-(2,4,6-trimethylpiperidino)butyl, and the like; and illustrative alkyl-substituted hexahydro - 1 - azepinylalkyl radicals are
2-(2-ethylhexahydro-1-azepinyl)ethyl,
2-(4-tert.-butylhexahydro-1-azepinyl)ethyl,
4-(2,4-dimethylhexahydro-1-azepinyl)butyl,
3-(3,3-dimethylhexahydro-1-azepinyl)propyl,
2-(2,4,6-tri-n-propylhexahydro-1-azepinyl)ethyl, and the like.

Illustrative halo radicals contemplated herein are fluoro, chloro, bromo, and iodo.

The cyclodehydrated product produced in this manner is a 12-phenyl-5H-dibenzo[c,g][1,2,6]thiadiazocine-6,6-dioxide. An organic side chain can be placed on the nucleus of the foregoing compound in lieu of the hydrogen existing in the 5-position by reacting the cyclodehydrated product with an organic halide, the organic portion of which is the desired side chain. The addition of the side chain is usually carried out under reflux conditions in a suitable aqueous solvent and in the presence of an alkali metal hydroxide such as sodium hydroxide, potassium hydroxide, and the like.

Those of the foregoing compounds which contain a basic side chain in the 6-position, i.e., the compounds where R is alkylaminoalkyl, 1-pyrrolidinylalkyl, alkyl-substituted 1-pyrrolidinylalkyl, piperidinoalkyl, alkyl-substituted piperidinoalkyl, hexahydro-1-azepinylalkyl, or alkyl-substituted hexahydro-1-azepinylalkyl radical, can also exist in the protonated or acid addition salt form. Stable acid addition salts can be formed with acids such as hydrochloric, hydrobromic, sulfuric, phosphoric, nitric, acetic, benzoic, salicylic, glycolic, succinic, nicotinic, tartaric, maleic, malic, pamoic, methanesulfonic, picric, cyclohexane sulfamic, lactic, and the like.

The 2-nitrobenzenesulfonyl chlorides which can be employed as starting materials herein are well known in the art and are commercially available. Illustrative 2-nitrobenzenesulfonyl chlorides are 2 - nitrobenzenesulfonyl chloride, 2-nitro-4-chlorobenzenesulfonyl chloride, 2-nitro-4-methoxybenzenesulfonyl chloride, 2-nitro-4-bromobenzenesulfonyl chloride, 2 - nitro-4,5-dimethoxybenzenesulfonyl chloride, 2-nitro-5-chlorobenzenesulfonyl chloride, etc.

Similarly, the other starting material, a 2-aminobenzophenone, is a well known compound. Methods for the preparation of 2-aminobenzophenones are taught by Lothrop et al., J. Am. Chem. Soc. 65, 363 (1943) and Sternbach et al., J. Org. Chem. 27, 3781 and 3788 (1962).

Illustrative 2-aminobenzophenones are 2-amino-4-bromobenzophenone,
2-amino-3-bromobenzophenone,
2-amino-4'-bromobenzophenone,
2-amino-5-bromobenzophenone,
2-amino-6-bromobenzophenone,
2-amino-3,5-dibromobenzophenone,
2-amino-2'-fluoro-5-bromobenzophenone,
2-amino-4-methoxy-5-bromobenzophenone,
2-amino-4'-methyl-5-bromobenzophenone,
2-amino-2'-chlorobenzophenone,
2-amino-2'-chlorobenzophenone,
2-amino-3-chlorobenzophenone,
2-amino-4-chlorobenzophenone,
2-amino-4'-chlorobenzophenone,
2-amino-5-chlorobenzophenone,
2-amino-6-chlorobenzophenone,
2-amino-2',5-dichlorobenzophenone,
2-amino-3,5-dichlorobenzophenone,
2-amino-4,5-dichlorobenzophenone,
2-amino-4',5-dichlorobenzophenone,
2-amino-2'-fluoro-5-chlorobenzophenone,
2-amino-3'-fluoro-5-chlorobenzophenone,
2-amino-4'-fluoro-5-chlorobenzophenone,
2-amino-2'-chloro-5-methylbenzophenone,
2-amino-3'-chloro-4'-methylbenzophenone.

Still other 2-aminobenzophenones are
2-amino-2'-chloro-4,5-dimethylbenzophenone,
2-amino-2',4'-dichloro-4,5-dimethylbenzophenone,
2-amino-2',5'-dichloro-4,5-dimethylbenzophenone,
2-amino-2'-methoxy-5-chlorobenzophenone,
2-amino-4'-methoxy-5-chlorobenzophenone,
2-amino-2-methoxy-5-chloro-5'-methylbenzophenone,
2-amino-2'-fluorobenzophenone,
2-amino-4'-fluorobenzophenone,
2-amino-5-fluorobenzophenone,
2-amino-2'-fluoro-5-methylbenzophenone,
2-amino-2'-trifluoromethylbenzophenone,
2-amino-3-trifluoromethylbenzophenone,
2-amino-3'-trifluoromethylbenzophenone,
2-amino-4-trifluoromethylbenzophenone,
2-amino-2',5-di(trifluoromethyl)benzophenone,
2-amino-2'-methoxybenzophenone,
2-amino-4-methoxybenzophenone,
2-amino-4'-methoxybenzophenone,
2-amino-5-methoxybenzophenone,
2-amino-2',4-dimethoxybenzophenone,
2-amino-3,4-dimethoxybenzophenone,
2-amino-3',4'-dimethoxybenzophenone,
2-amino-4,4',5-trimethoxybenzophenone,
2-amino-2',5-dimethyl-3'-methoxybenzophenone,
2-amino-2',3'-dimethyl-4'-methoxybenzophenone,
2-amino-2',5'-dimethyl-4'-methoxybenzophenone,
2-amino-2',4-dimethyl-5-methoxybenzophenone,
2-amino-2'-methyl-5-methoxybenzophenone,
2-amino-3,4-dimethylbenzophenone,
2'-isopropoxy-5-chlorobenzophenone,
2-amino-3-propyl-5-butylbenzophenone,
2-amino-4-ethyl-4'-butylbenzophenone, etc.

The overall synthetic route for the preparation of the compounds of this invention is schematically illustrated below in the preparation of 2-chloro-5-methyl-12-phenyl-5H-dibenzo-[c,g][1,2,6]thiadiazocine-6,6-dioxide:

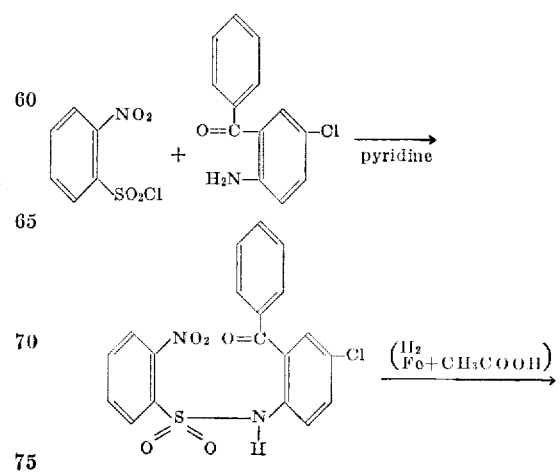

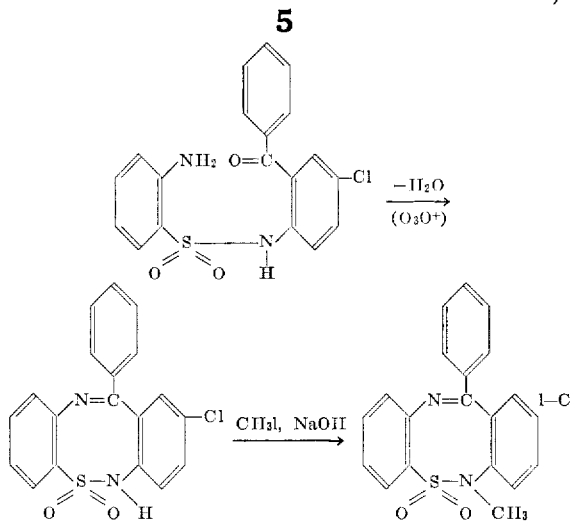

Compounds of this invention represented by Formula I where R is hydrogen can be reacted with chlorine to produce active chlorine compounds in which the hydrogen is replaced by chlorine. These active chlorine compounds are useful as bleaching agents, antiseptics, and disinfectants similar to the compounds disclosed in U.S. Pat. 3,115,495. In addition, the compounds where R is hydrogen are protective agents against anaphylaxis in mammals as has been substantiated by tests in guinea pigs, rats, and mice, and also are useful as antidiabetic agents.

Compounds of the type shown by Formula I where R is alkyl, aralkyl, or alkanoyl are also useful as antidiabetic and anti-inflammatory agents.

Compounds of the type shown by Formula I where R is a basic side chain are useful as central nervous system stimulants in mammals. These compounds will also form salts with fluosilicic acid which are useful as mothproofing agents in accordance with the teachings of U.S. Pat. 1,915,334 and U.S. Pat. 2,075,359. These compounds also form salts with thiocyanic acid which, in turn, condense with formaldehyde and produce resinous materials useful as pickling inhibitors according to U.S. Pat. 2,425,320 and U.S. Pat. 2,606,155. Similarly, salts of the compounds of Formula I where R is a basic side chain with trichloroacetic acid are useful as herbicides against Johnson grass, yellow foxtail, green foxtail, Bermuda grass, quack grass, and the like.

Compounds of Formula I can also be catalytically reduced by hydrogen in the presence of a noble metal catalyst so as to produce the corresponding dihydro derivatives, i.e., the 11,12-dihydro-12-phenyl-5H-dibenzo[c,g][1,2,6] thiadiazocine-6,6-dioxides. These latter compounds also form salts with fluosilicic acid, thiocyanic acid, or trichloracetic acid which are useful, respectively, as mothproofing agents, in the manufacture of pickling inhibitors, and as herbicides.

Compounds of the type shown by Formula IV and Formula V are useful as intermediates for the preparation of compounds of Formula I as disclosed herein.

When used pharmacologically as set forth above, for purposes of administration the compounds of this invention can be combined with solid or liquid pharmaceutical carriers and formulated in the form of tablets, powder packets, or capsules, using starch and similar excipients, or dissolved or suspended in suitable solvents or vehicles, for oral or parenteral administration.

This invention is further illustrated by the following examples.

EXAMPLE I

Preparation of 2'-benzoyl-4'-chloro-2-nitrobenzenesulfonanilide

A solution of 2-amino-5-chlorobenzophenone (about 25 grams, 0.108 mole) and o-nitrobenzenesulfonyl chloride (about 23.9 grams, 0.108 mole) in pyridine (about 50 milliliters) was prepared, refluxed for about one hour, and then concentrated by evaporation of the pyridine in vacuo. The obtained residue was washed with water and thereafter recrystallized from ethanol. About 35.2 grams of tan, prismatic crystals melting at 118° to 120° C. was obtained. The crystals were identified as 2'-benzoyl-4'-chloro-2-nitrobenzenesulfonanilide, obtained in about 78.5 percent yield.

Analysis.—Calc'd for $C_{19}H_{13}ClN_2O_5S$ (percent): C, 54.74; H, 3.14; Cl, 8.51; N, 6.72; S, 7.69. Found (percent): C, 54.81; H, 2.89; Cl, 8.59; N, 6.90; S, 7.86.

EXAMPLE II

Preparation of 2-amino-2'-benzoyl-4'-chlorobenzenesulfonanilide

About 10 grams of finely divided iron powder (100 mesh) was gradually added over a time period of about 75 minutes to a stirred solution of 2'-benzoyl-4'-chloro-2-nitrobenzenesulfonanilide (about 13.7 grams, 0.033 mole). After the addition was complete, the resulting admixture was maintained at about 95° C. for an additional time period of about 45 minutes, and thereafter a small amount of water (about 15 milliliters) was added.

The resulting admixture was then heated to and held at about 95° C. for about one hour and 45 minutes after which time the admixture was allowed to cool and ice water (about 400 milliliters) was added thereto.

The thus produced mixture was extracted with several aliquots of methylene chloride, the extracts combined and dried over magnesium sulfate, and thereafter concentrated by evaporation of the methylene chloride.

The obtained oily residue was observed to crystallize. The residue was then recrystallized from 95 weight percent ethanol. About 10.8 grams of crystals in the form of tan prisms melting at 96.5° to 97.5° C. was obtained. The crystals were identified as 2-amino-2'-benzoyl-4'-chlorobenzenesulfonanilide, obtained in about 85 percent yield.

Analysis.—Calc'd for $C_{19}H_{15}ClN_2O_3S$ (percent): C, 58.99; H, 3.91; Cl, 9.16; N, 7.24; S, 8.29. Found: (percent): C, 58.92; H, 3.99; Cl, 9.27; N, 6.90; S, 8.26.

EXAMPLE III

Preparation of 2-chloro-12-phenyl-5H-dibenzo-[c,g][1,2,6]thiadiazocine-6,6-dioxide 2 - amino-2'-benzoyl - 4' - chlorobenzenesulfonanilide (about 5 grams, 0.013 mole) was dissolved in dry toluene (about 50 milliliters) and refluxed under a water trap for about 10 minutes, then p-toluenesulfonic acid (about 0.2 grams) was added thereto, and the refluxing continued for about 16 hours during which time about 0.013 mole of water was recovered from the refluxing mixture.

The mixture was then extracted with a dilute aqueous ammonium hydroxide solution (weight ratio of water to ammonia about 20:1 respectively) and subsequently with water. The ammonium hydroxide and water extracts were combined and extracted with methylene chloride, and the methylene chloride extract dried over magnesium sulfate and concentrated by evaporation.

The remaining residue was dissolved in 1 weight percent aqueous sodium hydroxide solution and reprecipitated by the addition of acetic acid. The obtained precipitate was recovered by filtration and recrystallized from 95 weight percent ethanol. About 2.12 grams of crystals in the form of yellow prisms melting at 188° to 189° C. was produced. The crystals were identified as 2-chloro-12-phenyl-5H-dibenzo[c,g][1,2,6]thiadiazocine-6,6-dioxide, obtained in about 44.4 percent yield.

Analysis.—Calc'd for $C_{19}H_{13}ClN_2O_2S$ (percent): C, 61.87; H, 3.55; Cl, 9.61; N, 7.60; S, 8.69. Found (percent): C, 61.89; H, 3.36; Cl, 9.71; N, 7.61; S, 8.62.

In a manner similar to Examples I through III but starting with 2-amino-3-bromobenzophenone instead of 2 - amino- 5 - chlorobenzophenone the 4 - bromo - 12- phenyl - 5H - dibenzo]c,g][1,2,6]thiadiazocine - 6,6 - dioxide can be prepared, starting with 2-amino-3,5-dibromobenzophenone the 2,4-dibromo-12-phenyl-5H-dibenzo[c,g][1,2,6]thiadiazocine-6,6-dioxide can be prepared, starting with 2-amino-2'-fluoro-5-bromobenzophenone the 2 - bromo-12-(2-fluorophenyl)-5H-dibenzo [c,g][1,2,6]thiadiazocine - 6,6 - dioxide can be prepared, starting with 2-amino-4-methoxy-5-bromobenzophenone the 2 - bromo-3-methoxy-12-phenyl-5H-dibenzo[c,g][1,2,6]thiadiazocine-6,6-dioxide can be prepared, starting with 2-amino-2'-chloro-4,5-dimethylbenzophenone, the 2,3-dimethyl-12-(2-chlorophenyl) - 5H-dibenzo[c,g][1,2,6] thiadiazocine-6,6-dioxide can be prepared, starting with 2-amino-2'-methoxy-5-chloro-5'-methylbenzophenone the 2-chloro-12-(2-methoxy-5-methylphenyl) - 5H - dibenzo [c,g][1,2,6]thiadiazocine-6,6-dioxide can be prepared, starting with 2-amino-3-trifluoromethylbenzophenone the 4 - trifluoromethyl-12-phenyl - 5H - dibenzo[c,g][1,2,6] thiadiazocine-6,6-dioxide can be prepared, etc.

Similarly, using 2-nitro - 4 - methoxybenzenesulfonyl chloride instead of o-nitrobenzenesulfonyl chloride the 2-chloro-9-methoxy-12-phenyl - 5H - dibenzo[c,g][1,2,6] thiadiazocine - 6,6 - dioxide can be prepared, using 2-nitro-4-bromobenzenesulfonyl chloride the 2-chloro-9-bromo - 12 - phenyl-5H-dibenzo[c,g][1,2,6]thiadiazocine-6,6-dioxide can be prepared, using 2-nitro-4,5-dimethoxybenzenesulfonyl chloride the 2-chloro-8,9-dimethoxy-12-phenyl-5H-dibenzo[c,g][1,2,6]thiadiazocine - 6,6 - dioxide can be prepared, etc.

EXAMPLE IV

Preparation of 2-chloro-5-[2-(diethylamino)ethyl] - 12-phenyl-5H-dibenzo[c,g][1,2,6]thiadiazocine-6,6-dioxide Diethylaminoetheyl chloride (about 5.07 grams, 0.037 mole) was added to a stirred solution of 2-chloro-12-phenyl-5H-dibenzo[c,g][1,2,6]thiadiazocine-6,6 - dioxide (about 9.4 grams, 0.025 mole) in ethanol (about 70 milliliters) and 2.5 weight percent aqueous sodium hydroxide solution (about 50 milliliters) maintained at about 10° C. After the addition was complete, the resulting mixture was stirred at about room temperature for about five hours, then left standing for about 18 hours, diluted with water (about 250 milliliters) and filtered.

About 11.75 grams of yellow, prismatic crystals melting at 126° to 128° C. was recovered upon filtration. Recrystallization from 95 weight percent ethanol did not elevate the melting point of the crystals. The crystals were identified as 2-chloro-5-[2-(diethylamino)ethyl]-12-phenyl-5H-dibenzo[c,g][1,2,6]thiadiazocine - 6,6 - dioxide, obtained in about 100 percent yield.

*Analysis.*—Calc'd for $C_{25}H_{26}ClN_3O_2S$ (percent): C, 64.16; H, 5.60; Cl, 7.57; N, 8.98; S, 6.85. Found (percent): C, 63.91; H, 5.73; Cl, 7.80; N, 9.00; S, 7.13.

In a manner similar to Example IV, using benzoyl chloride in lieu of diethylaminoethyl chloride, the 2-chloro-5-benzoyl - 12 - phenyl - 5H - dibenzo[c,g][1,2,6] thiadiazocine-6,6-dioxide can be prepared, using acetyl chloride the 2-chloro - 5 - acetyl-12-phenyl-5H-dibenzo [c,g][1,2,6]thiadiazocine - 6,6 - dioxide can be prepared, using 2-(diisopropylamino)ethyl chloride hydrochloride the 2 - chloro-5-[2-(diisopropylamino)ethyl]-12-phenyl-5H-dibenzo[c,g][1,2,6]thiadiazocine-6,6-dioxide can be prepared, using 2-(methyl-1-pyrrolidinyl)ethyl chloride hydrochloride the 2-chloro-5-[2-(2-methyl-1-pyrrolidinyl)ethyl]12-phenyl - 5H - dibenzo[c,g][1,2,6]thiadiazocine-6,6-dioxide can be prepared, using 2-(2,2,4-trimethyl-1-pyrrolidinyl)ethyl chloride the 2-chloride-5-[2-(2,2,4-trimethyl-1-pyrrolidinyl)ethyl] - 12 - phenyl-5H-dibenzo[c,g][1,2,6]thiadiazocine-6,6-dioxide can be prepared, using N-(beta-chloroethyl)piperidine hydrochloride the 2-chloro-5-(2-piperidinoethyl)-12-phenyl-5H-dibenzo[c,g][1,2,6]thiadiazocine-6,6-dioxide can be prepared, using N-hexamethyleneiminoethyl chloride the 2-chloro-5-(hexahydro-1H-azepin-1-yl) - 12 - phenyl-5H-dibenzo[c,g][1,2,6]thiadiazocine-6,6-dioxide can be prepared, using 2-(tert.-butylamino)ethyl chloride hydrochloride the 2-chloro-5-[2-(tert.-butylamino)ethyl]-12-phenyl-5H-dibenzo[c,g][1,2,6]thiadiazocine - 6,6 - dioxide can be prepared, using 3-(dimethylamino)propyl chloride the 2-chloro-5-[3-(dimethylamino)-propyl] - 12 - phenyl-5H-dibenzo[c,g][1,2,6]thiadiazocine-6,6-dioxide can be prepared, using N-(gamma-chloropropyl)piperidine the 2-chloro-5-(3-piperidinopropyl)-12-phenyl - 5H - dibenzo [c,g][1,2,6]thiadiazocine-6,6-dioxide can be prepared, etc.

EXAMPLE V

Preparation of 2-chloro-5-methyl-12-phenyl-5H-dibenzo [c,g][1,2,6]thiadiazocine-6,6-dioxide Methyl iodide (about 11.5 milliliters) was added to a stirred solution of 2-chloro-12-phenyl-5H-dibenzo[c,g] [1,2,6]thiadiazocine-6,6-dioxide (21.2 grams, 0.058 mole) in water (about 120 milliliters), ethanol (about 180 milliliters), and an aqueous 5 weight percent solution of sodium hydroxide (about 60 milliliters), chilled to about 5° C. The resulting mixture was stirred at about room temperature for about five hours, more methyl iodide (about 11.5 milliliters) added, and the admixture diluted with an equal volume of water and then filtered.

Upon filtration about 21.9 grams of a yellow solid melting at 228° to 230° C. was recovered. Recrystallization from ethyl acetate produced about 16.4 grams of colorless, prismatic crystals melting at 230° to 232° C. A second recrystallization did not elevate the melting point further. The crystals were identified as 2-chloro-5-methyl-12-phenyl - 5H - dibenzo[c,g][1,2,6]thiadiazocine-6,6-dioxide, obtained in about 99 percent yield.

*Analysis.*—Calc'd for $C_{20}H_{15}ClN_2O_2S$ (percent): C, 62.74; H, 3.95; Cl, 9.26; N, 7.32; S, 8.37. Found (percent): C, 62.36; H, 4.08; Cl, 9.45; N, 7.37; S, 8.00.

In a manner analogous to Example V but using ethyl iodide in lieu of methyl iodide the 2-chloro-5-ethyl-12-phenyl-5H-dibenzo[c,g][1,2,6]thiadiazocine-6,6 - dioxide can be prepared, using propyl iodide the 2-chloro-5-propyl-12-phenyl - 5H - dibenzo[c,g][1,2,6]thiadiazocine-6,6-dioxide can be prepared, using isopropyl iodide the 2-chloro-5-isopropyl-12-phenyl - 5H - dibenzo[c,g][1,2,6] thiadiazocine-6,6-dioxide can be prepared, using butyl iodide the 2 - chloro-5-butyl-12-phenyl-5H-dibenzo[c,g] [1,2,6]thiadiazocine-6,6-dioxide can be prepared, etc.

EXAMPLE VI

Preparation of 2'-benzoyl-4,4'-dichloro-2-nitrobenzenesulfonanilide

A solution of 2-amino-5-chlorobenzophenone (about 25 grams, 0.108 mole) and 4-chloro-2-nitrobenzenesulfonyl chloride (about 27.63 grams, 0.108 mole) in pyridine (about 50 milliliters) was prepared and refluxed for about one hour. Thereafter the pyridine was removed from the solution by evaporation in vacuo, and the remaining residue was triturated with water and then with hot ethanol. About 37.8 grams of a crystalline solid melting at 161° to 167.5° C. was obtained. Recrystallization from ethyl acetate raised the melting point to 168° to 170° C. The solid was identified as 2'-benzoyl-4,4'-dichloro-2-nitrobenzenesulfonanilide, obtained in about 78 percent yield.

*Analysis.*—Calc'd for $C_{19}H_{12}Cl_2N_2O_5S$ (percent): C, 50.57; H, 2.68; Cl, 15.71; N, 6.21; S, 7.11. Found (percent): C, 50.79; H, 2.31; Cl, 15.82; N, 6.17; S, 7.15.

EXAMPLE VII

Preparation of 2-amino-2'-benzoyl-4,4'-dichlorobenzensulfonanilide

2'-benzoyl-4,4'-dichloro - 2 - nitrobenzene sulfonanilide (about 20.75 grams, 0.046 mole) was dissolved in acetic acid (about 280 milliliters). While the resulting solution was stirred, about 14 grams of finely divided iron powder was gradually added over a time period of about 75 minutes, and at a temperature of about 90° to 95° C. After the addition of the iron powder was completed the resulting admixture was permitted to stand for about 18 hours.

Thereafter the admixture was heated to and maintained at about 90° C. for about 45 minutes after which time period water (about 21 milliliters) was added thereto. Subsequently the obtained admixture was again held at about 90° C. for about 105 minutes, and then allowed to cool to about room temperature.

The cooled admixture was diluted with water (about 560 milliliters), and extracted with dichloromethane. The extract was concentrated by evaporation of the dichloromethane and the obtained residue recrystallized from ethanol. Tan, prismatic crystals melting at 108° to 109° C. were obtained. The crystals were identified as 2-amino-2'-benzoyl-4,4'-dichlorobenzenesulfonanilide.

*Analysis.*—Calc'd for $C_{19}H_{14}Cl_2N_2O_3S$ (percent): C, 54.17; H, 3.35; Cl, 16.83; N, 6.65; S, 7.61. Found (percent): C, 53.90; H, 3.04; Cl, 16.66; N, 6.53; S, 7.65.

EXAMPLE VIII

Preparation of 2,9-dichloro-12-phenyl-5H-dibenzo[c,g][1,2,6]thiadiazocine-6,6-dioxide A mixture of 2-amino-2'-benzoyl-4,4'-dichlorobenzenesulfonanilide (about 12.6 grams, 0.03 mole), p-toluenesulfonic acid (about 0.5 gram), and toluene (about 200 milliliters) was heated under reflux for about 23 hours using a water trap. Thereafter the mixture was filtered, and the filtrate extracted with a dilute aqueous ammonium hydroxide solution (weight ratio of water to ammonia about 20:1, respectively) and subsequently with water. The foregoing aqueous extracts were then combined and extracted with dichloromethane several times.

The dichloromethane extracts were, in turn, combined and extracted with an aqueous 1 weight percent sodium hydroxide solution. The resulting alkaline extract was then used to further extract the above filtrate, i.e., the toluene solution, acidified with acetic acid, and then extracted with dichloromethane.

The latter dichloromethane extract was concentrated by evaporating the dichloromethane and the thus-obtained residue recrystallized from ethanol. About 3.34 grams of yellow, prismatic crystals melting at 241° to 242.5° C. were produced. An additional recrystallization raised the melting point to 242° to 243° C. The crystals were identified as 2,9-dichloro-12-phenyl - 5H - dibenzo[c,g][1,2,6] thiadiazocine-6,6-dioxide.

*Analysis.*—Calc'd for $C_{19}H_{12}Cl_2N_2O_2S$ (percent): C, 56.59; H, 3.00; Cl, 17.58; N, 6.95; S, 7.95. Found (percent): C, 56.72; H, 3.37; Cl, 17.85; N, 6.80; S, 8.08.

I claim:

1. A 5H-dibenzo[c,g][1,2,6]thiadiazocine-6,6 - dioxide represented by the formula

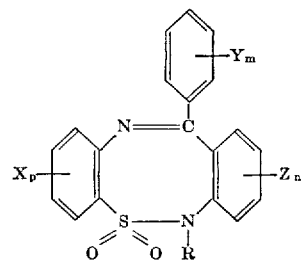

wherein X, Y, and Z are members of the group consisting of halo, trifluoromethyl, alkyl, and alkoxy radicals, R is a member of the group consisting of hydrogen, alkyl, phenylalkyl, naphthylalkyl, alkanoyl, alkylaminoalkyl, 1-pyrrolidinylalkyl, alkyl-substituted 1-pyrrolidinylalkyl, piperidinoalkyl, alkyl-substituted piperidinoalkyl, hexahydro-1-azepinylalkyl, and alkyl-substituted hexahydro-1-azepinlalkyl radicals, and $m$, $n$, and $p$ are integers having a value from 0 to 3 inclusive, with the proviso that the alkyl portions of the foregoing radicals contain no more than four carbon atoms; and the corresponding acid addition salts thereof.

2. The compound in accordance with claim 1 wherein R is hydrogen, Z is chloro situated in the 2-position, $m$ and $p$ have value of zero, and $n$ has a value of 1.

3. The compound in accordance with claim 1 wherein R is hydrogen, Z is chloro situated in the 2-position, X is chloro situated in the 9-position, $m$ has a value of zero, and $n$ and $p$ have a value of 1.

4. The compound in accordance with claim 1 wherein R is 2-(diethylamino)ethyl, Z is chloro situated in the 2-position, $m$ and $p$ have a value of zero, and $n$ has a value of 1.

5. The compound in accordance with claim 1 wherein R is methyl, Z is chloro situated in the 2-position, $m$ and $p$ have a value of zero, and $n$ has a value of 1.

References Cited

UNITED STATES PATENTS

| 3,090,783 | 5/1963 | Yale | 260—243 |
| 3,123,614 | 3/1964 | Yale et al. | 260—296 |
| 3,247,224 | 4/1966 | Enders et al. | 260—327 |
| 3,387,002 | 6/1968 | Yale et al. | 260—327 |

OTHER REFERENCES

Klosa: Chemical Abstract, vol. 58 (1963), p. 12562.

JAMES A. PATTEN, Primary Examiner

U.S. Cl. X.R.

71—91; 252—186, 391; 260—239, 293.4, 295.5, 326.3, 326.5, 326.61, 326.81, 326.82, 556, 591, 999

UNITED STATES PATENT OFFICE
CERTIFICATE OF CORRECTION

Patent No. 3,534,062    Dated Oct. 13, 1970

Inventor(s) John B. Wright

It is certified that error appears in the above-identified patent and that said Letters Patent are hereby corrected as shown below:

Column 1, line 63, for "$NH_2$" read -- $NO_2$ --. Column 2, line 15, for "$Z_n$" read -- $Y_m$ --. Column 2, line 20, for "$Y_m$" read -- $Z_n$ --. Column 5, line 8, for "$(O_3O^+)$" read -- $(H_3O^+)$ --. Column 5, line 15, for "  1-C " read --  Cl --. Column 7, line 1, for "]c,g]" read -- [c,g] --. Column 7, line 34, for "Diethylaminotheyl" read -- Diethylaminoethyl --. Column 7, line 68, for "chloride" read -- chloro --. Column 10, line 20, claim 1, for "azepinlalkyl" read -- azepinylalkyl --.

Signed and sealed this 1st day of June 1971.

(SEAL)
Attest:

EDWARD M. FLETCHER, JR.
Attesting Officer

WILLIAM E. SCHUYLER, JR.
Commissioner of Patents